W. C. LIPE & J. W. COUGHTRY.
S. S. COUGHTRY, ADMINISTRATRIX OF J. W. COUGHTRY, DEC'D.
HEADING AND FINISHING MECHANISM FOR CIGAR MAKING MACHINES.
APPLICATION FILED SEPT. 18, 1913.

1,134,470.

Patented Apr. 6, 1915.
6 SHEETS—SHEET 1.

W. C. LIPE & J. W. COUGHTRY.
S. S. COUGHTRY, ADMINISTRATRIX OF J. W. COUGHTRY, DEC'D.
HEADING AND FINISHING MECHANISM FOR CIGAR MAKING MACHINES.
APPLICATION FILED SEPT. 18, 1913.

1,134,470.

Patented Apr. 6, 1915.

6 SHEETS—SHEET 2.

Witnesses:

Inventors:

Attorneys.

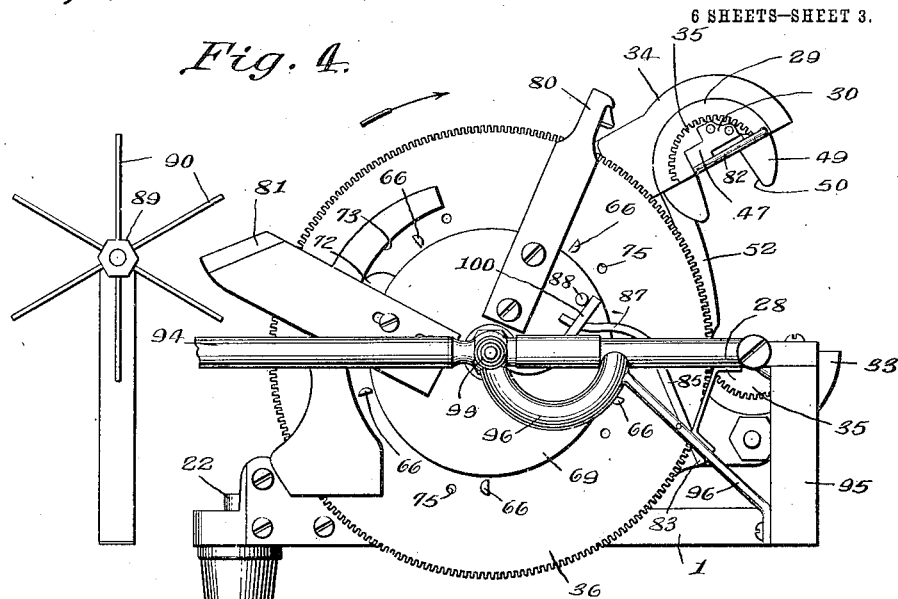
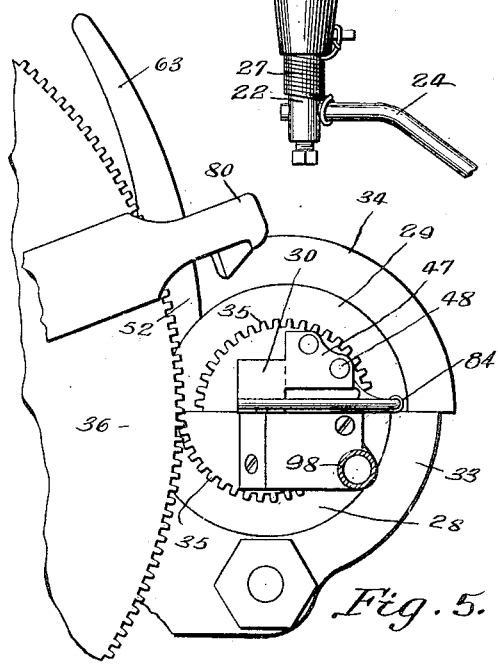
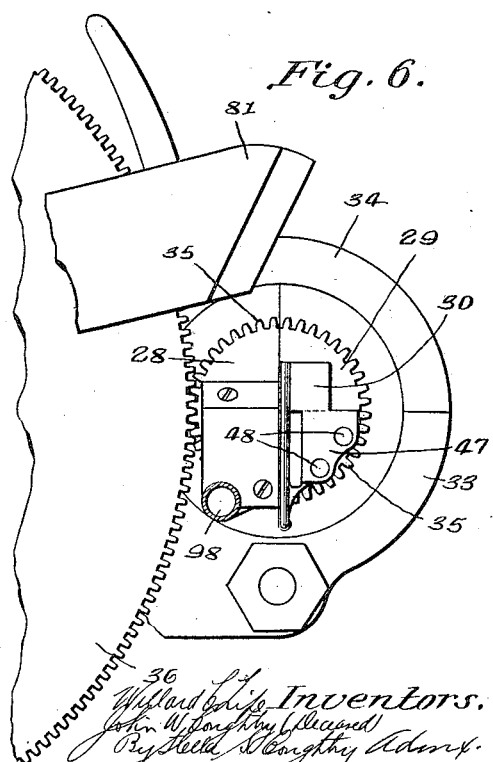

W. C. LIPE & J. W. COUGHTRY.
S. S. COUGHTRY, ADMINISTRATRIX OF J. W. COUGHTRY, DEC'D.
HEADING AND FINISHING MECHANISM FOR CIGAR MAKING MACHINES.
APPLICATION FILED SEPT. 18, 1913.

1,134,470.

Patented Apr. 6, 1915.

6 SHEETS—SHEET 4.

Witnesses
Chas. H. Young.
S. Davis.

Inventors:
Willard C. Lipe
John W. Coughtry (deceased)
By Stella M. Coughtry Admx.

By
Cannon Adell Bodell
Attorneys.

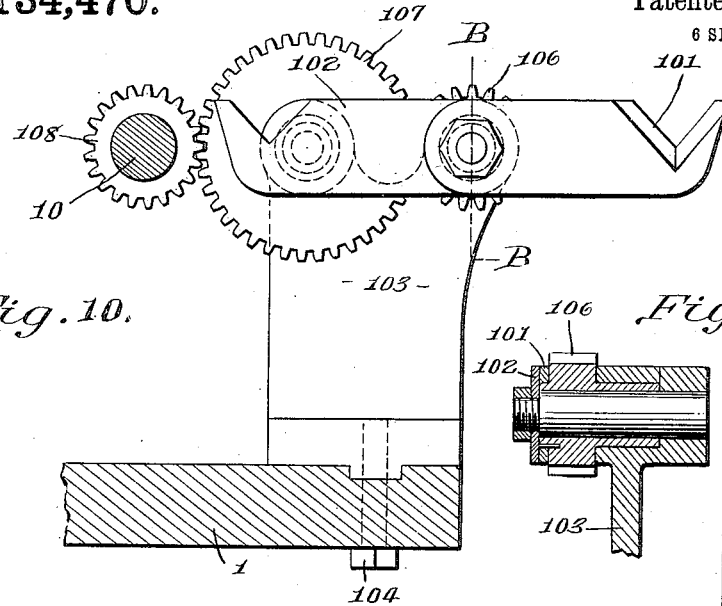
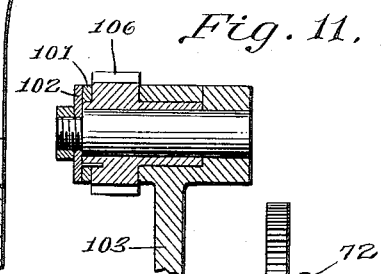
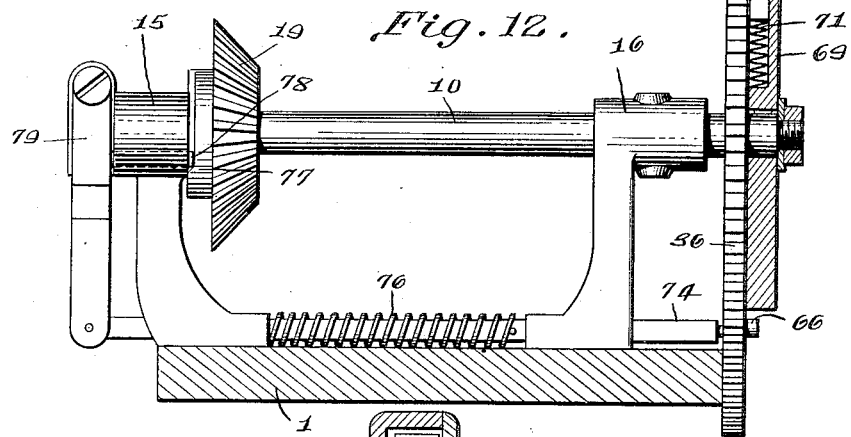
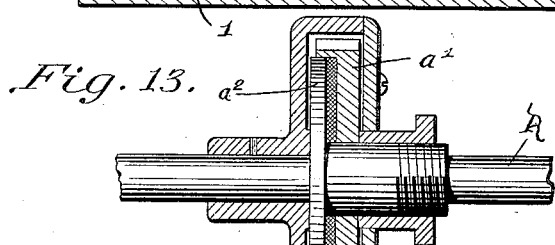
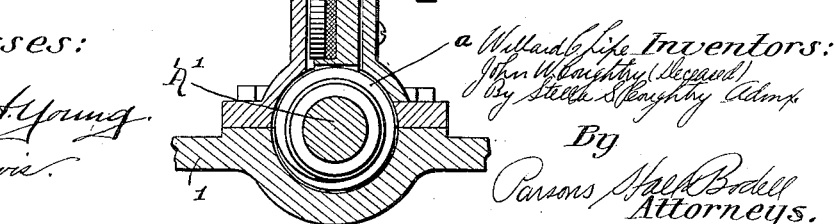

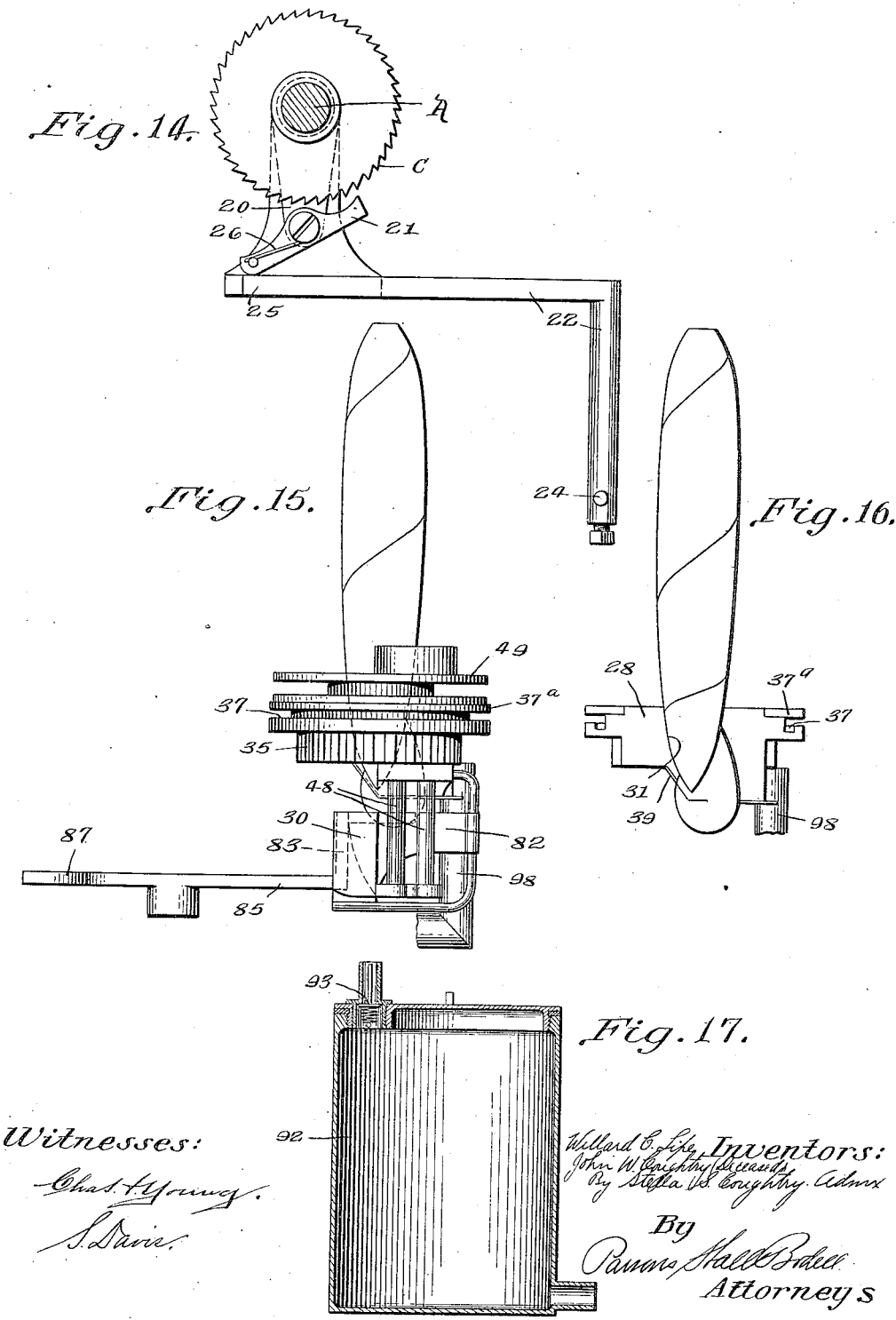

UNITED STATES PATENT OFFICE.

WILLARD C. LIPE, OF SYRACUSE, AND JOHN W. COUGHTRY, DECEASED, LATE OF SYRACUSE, NEW YORK, BY STELLA S. COUGHTRY, ADMINISTRATRIX, OF SYRACUSE, NEW YORK.

HEADING AND FINISHING MECHANISM FOR CIGAR-MAKING MACHINES.

1,134,470. Specification of Letters Patent. Patented Apr. 6, 1915.

Original application filed November 16, 1906, Serial No. 343,762. Divided and this application filed September 18, 1913. Serial No. 790,552.

*To all whom it may concern:*

Be it known that WILLARD C. LIPE, a citizen of the United States, and a resident of Syracuse, in the county of Onondaga and State of New York, and JOHN W. COUGHTRY, deceased, late a citizen of the United States and a resident of Syracuse, county and State aforesaid, did invent a new and useful Heading and Finishing Mechanism for Cigar-Making Machines, of which the following is a specification.

Our invention relates to cigar making machines, and particularly to heading and finishing mechanism, which is especially simple in construction and highly efficient in use; and the invention consists in the combinations and constructions hereinafter set forth and claimed.

In describing this invention reference is had to the accompanying drawings, in which like characters designate corresponding parts in all the views.

Figure 1:
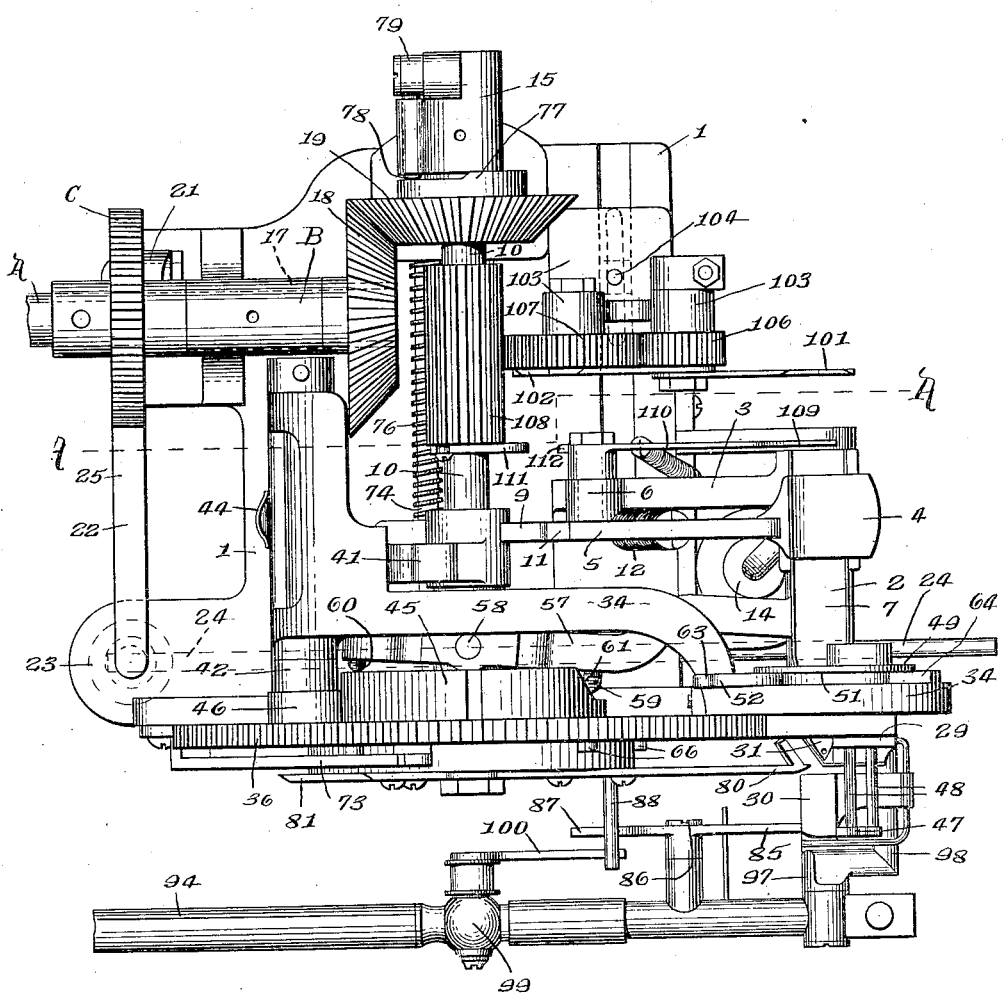
Figure 2:
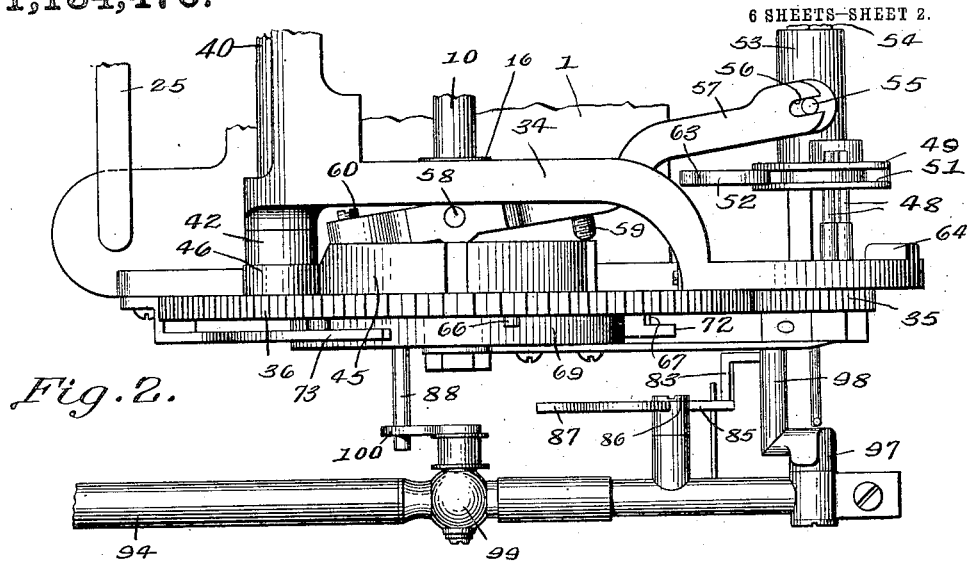
Figure 3:
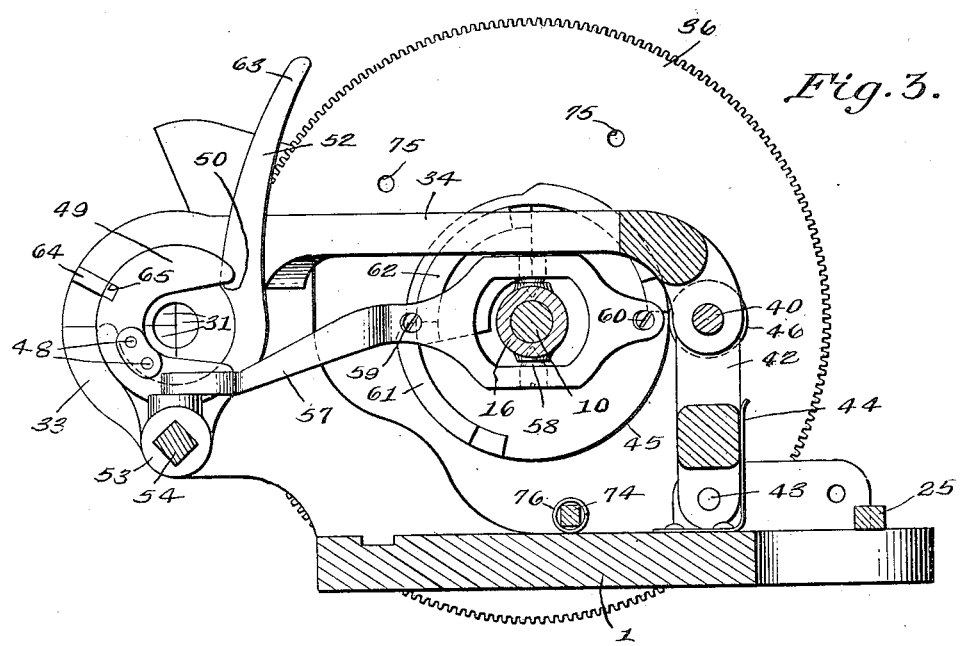
Figure 7:
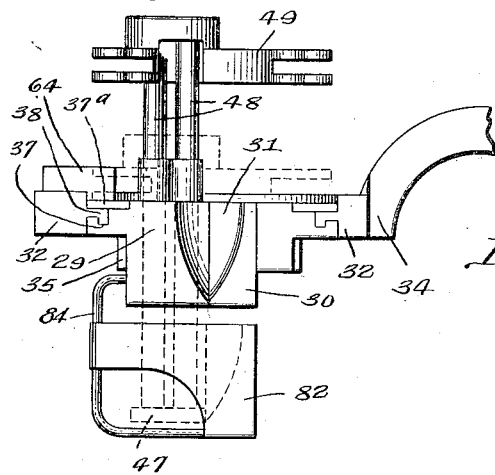
Figure 8:
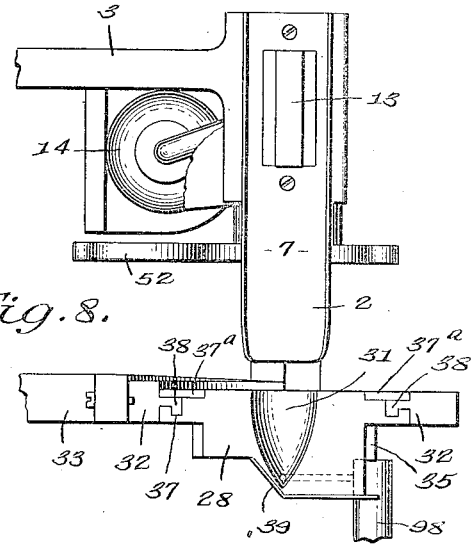
Figure 9:
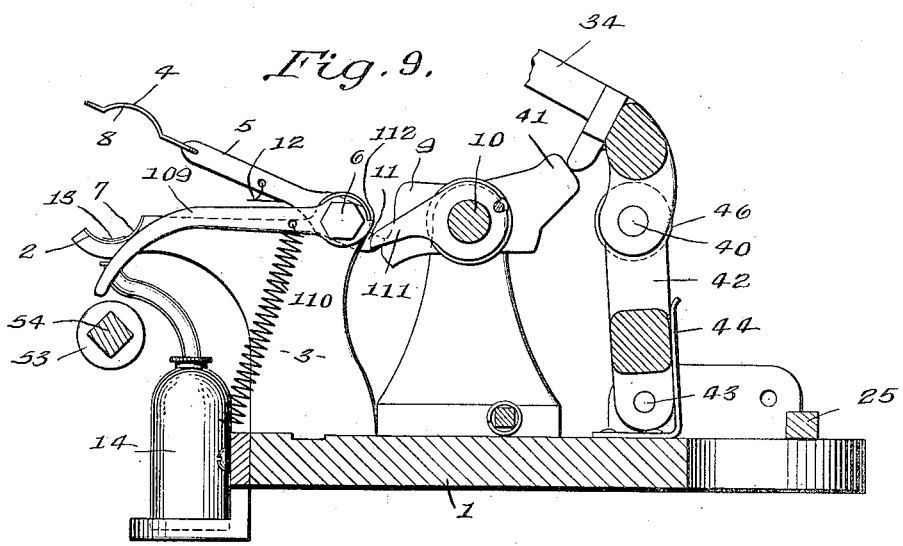

Figure 1 is an enlarged view, partly broken away, of our heading mechanism, and portions of the driving means and the frame. Figs. 2 and 3 are, respectively, plan, and elevation, partly in section, of a part of the mechanism seen in Fig. 1. Fig. 4 is an elevation of a portion of the heading mechanism, and contiguous parts. Figs. 5 and 6 are enlarged detail elevations, partly in section, of the thimble, and coacting parts. Figs. 7 and 8 are opposing face views, partly broken away, of the sections of the thimble, and adjacent parts. Figs. 9 and 10 are sectional views, partly in elevation, on line A—A, Fig. 1, looking in opposite directions. Fig. 11 is a sectional view, on line B—B, Fig. 10. Fig. 12 is a detail elevation, partly in section, of portions of the heading mechanism and the frame. Fig. 13 is a detail view of the connection from the main driving shaft of a complete cigar making machine. Fig. 14 is an elevation, partly in section, of a portion of the means for controlling the operation of the heading mechanism, and contiguous parts. Figs. 15 and 16 are detail views showing the method of cutting the wrapper. Fig. 17 is a sectional view of the reservoir for the paste.

Our heading mechanism may be used alone or in connection with a machine embodying filling and rolling mechanism, and is usually supported by the main frame of a cigar making machine such as that disclosed in our pending application, Sr. No. 343,762, filed Nov. 16, 1906, of which this application is a division.

Our heading mechanism is here shown as supported by a frame member, as a shelf 1, forming part of the main frame of our cigar making machine described in our pending application referred to. The heading mechanism comprises a holder for the cigar, a thimble for finishing the head end of the cigar, and trimming knives. Said holder for the cigar, Figs. 1, 8 and 9, is composed of a section 2 fixed to a support 3, and a section 4 fixed to the free end of a movable arm 5 having its other end pivoted at 6 to the support 3, these sections 2, 4 being formed with concave faces 7, 8 for engaging opposite surfaces of the cigar. Normally, the section 4 is separated from the section 2, and is held in such position by a cam 9, Fig. 9, which is fixed to a revoluble actuating shaft 10 and coacts with a shoulder 11 on the arm 5. Before the heading mechanism is operated, the partly finished cigar is placed upon the section 2 of the cigar-holder, and immediately upon the commencement of the revolution of the shaft 10, the cam 9 is rotated out of engagement with the shoulder 11, whereupon a spring 12, best seen in Fig. 1, rocks the free end of the arm 5 downwardly carrying the section 4 into position to coöperate with the section 2 for holding the cigar stationary. When the shaft 10 is assuming the limit of its rotation, the cam 9 again engages the shoulder 11, and rocks the free end of the arm 5 upwardly against the action of the spring 12, thus moving the section 4 from the section 2 to release the cigar within the holder.

A removable part 13, Figs. 8 and 9, projects through an opening in the section 2 of the cigar-holder, and is provided with any desirable means for marking the cigar. As shown in Fig. 9, a suitable device, as an alcohol-lamp 14, may be utilized for heating the removable part 13 to facilitate branding of the cigar by said part 13.

The actuating shaft 10 is journaled in bearings 15, 16, Fig. 12, and is rotated by a driving shaft A, Fig. 1, which is connected to the main shaft A', Fig. 13, of the complete cigar making machine of our copending application referred to; and the shaft 10 is connected to the shaft A by a sleeve 17, Fig. 1, and means coöperating therewith. The shafts A, A' are connected by suitable means, as a worm $a$ on the shaft A' and a worm gear $a'$ loose on the shaft A, and frictionally engaging a disk $a^2$ fixed on said shaft, Fig. 13. Said disk $a^2$, worm gear $a'$ and worm $a$ constitute means for frictionally connecting the shafts A, A'. The sleeve 17 is loosely mounted on the end of the shaft A, is journaled in the bearing B for the shaft A, and is provided at one end with a bevel-gear 18 meshing with a bevel-gear 19 fixed on the shaft 10, and at its other end with a radial arm 20, Fig. 14, on which is pivotally supported a pawl 21 for coacting with a ratchet wheel C mounted on, and rotatable with, the shaft A. When the pawl 21 is engaged with the ratchet-wheel C, these parts C, 21, and the arm 20, sleeve 17 and bevel-gears 18, 19 connect the driving and driven shafts A and 10. Hence the ratchet wheel C and pawl 21 constitute a clutch of which the pawl is the shiftable member.

Means is provided to control the connection of the heading mechanism to the driving shaft A, and as here shown, this means comprises a manually-operated member 22, Figs. 1 and 14, pivoted intermediate of its ends in a bearing 23, Fig. 4, one arm 24 of said member serving as a hand-piece, and the other arm 25 thereof operating to engage the pawl 21, Fig. 14, and hold the same against the action of a spring 26, out of position to coact with the ratchet-wheel C. When it is desired to operate the heading mechanism, the member 22 is rocked on its pivot, moving the free end of its arm 25 laterally out of engagement with the pawl 21, whereupon the spring 26 engages said pawl with the ratchet-wheel C, and motion is transmitted to the heading mechanism through the shaft 10. Immediately after the commencement of the operation of the heading mechanism, the operating member 22 is released and is then returned to its normal position by a spring 27, Fig. 4. Consequently, when the shaft 10 reaches the limit of each rotation, the pawl 21 engages the free end of the operating arm 25 and is forced out of engagement with the ratchet-wheel C, thus causing the operation of the heading mechanism to cease.

The thimble, Figs. 7 and 8, includes a plurality of movable sections 28, 29 and 30, is provided with a recess 31 for receiving the head end of the cigar, is arranged at one end of the holder for the cigar, and is revoluble in a bearing 32 having its axis substantially coincident with that of the cigar when clamped by such holder. Said bearing 32 is formed in opposing faces of a fixed support 33 and a movable carrier 34, Figs. 4 and 9. Each of the sections 28, 29 of the thimble is provided with a semicircular series of teeth, Fig. 4, and when the thimble is closed, these series of teeth form a pinion 35, Fig. 6, for meshing with a revoluble power-transmitting element, or gear, 36. Said sections 28, 29 are also provided with peripheral cutouts or channels, Figs. 7 and 8, angular in cross-section, forming a groove 37 for receiving an annular shoulder 38 of substantially the same cross-section as such groove 37, and provided within the bearing 32, said groove 37 and shoulder 38 coacting to hold the thimble within the bearing 32. One side wall of the groove 37 is a removable plate 37$^a$, Figs. 7 and 8, which permits the sections 28, 29 to be removed and replaced. The section 28 comprises substantially one-half of the thimble, and is provided with one-half of the recess 31, and with a knife 39, Fig. 8, having an angularly-extending edge, one portion of which is arranged along one of the sides of the inner end of the recess 31, and the other portion of which extends crosswise of the point of said recess. The sections 29, 30 comprise the other half of the thimble, and are each provided with a one-quarter of the recess 31. When the thimble is closed, opposing surfaces of the sections 28, 29 at one side of the recess 31 are slightly spaced apart to receive the portion of the wrapper projecting from the right-hand side of the head of the cigar, as shown in Fig. 16, and the like surfaces of the sections 28, 30 at the opposite side of such recess are spaced apart a slightly greater distance than said opposing surfaces of the sections 28 and 29 so that the section 30 will not engage the contiguous free end of the wrapper at the left-hand side of the head of the cigar when said section 30 moves endwise into its operative position.

The section 29 of the thimble is normally separated from the section 28 and the gear 36, as seen in Fig. 4, and is automatically movable by the carrier 34 in a plurality of directions into and out of operative position to partially close, and open, the thimble. This carrier 34 is loosely mounted on a shiftable pivot 40, Figs. 3 and 9, is engaged, and movable upwardly on its pivot, by a cam 41 fixed to the shaft 10, and moves downwardly on said pivot by gravity until opposing surfaces of the sections 28, 29 are in contact. The pivot 40 is secured to the free end of a support 42 which is pivoted at 43 to suitable bearings on the frame 1, and is rocked in one direction by a spring 44, and in the opposite direction by a cam 45, Fig. 3, fixed to the shaft 10, and coacting with a roller 46 on said pivot 40.

The section 30 of the thimble is supported by the section 29, is movable therewith relatively to the section 28, and is movable automatically endwise of the axis of the cigar and the thimble, relatively to said section 29 into and out of operative position to completely close, and partially open, the thimble. The end of the section 30 nearest the point of the portion of the recess 31 within such section is provided with a lateral extension 47, Figs. 5 and 6, fixed to corresponding ends of two parallel parts or rods 48 movable in guides or openings extending through the section 29 parallel to the axis of the thimble. Secured to the opposite ends of the rods 48 and arranged concentric with the axis of the thimble, is a ring 49, Figs. 2, 3 and 7, having a radial passage 50, Fig. 3, for receiving the contiguous portion of the cigar and permitting the ring 49 to move with the sections 29, 30 of the thimble into and out of operative position relatively to the cigar. Said ring 49 is provided with a peripheral groove 51 for receiving an actuating member or shifter 52, Figs. 2 and 3, and permitting revoluble movement of the section 30 and the ring 49 relatively to such member or shifter 52. This member 52 is fixed to one end of a reciprocating sleeve 53, Figs. 2 and 3, mounted on a guide, or rod 54, and provided with a pin 55 arranged in a slot 56 in one end of an actuating arm 57 pivoted intermediate of its ends at 58, Fig. 2, to the bearing 16 of the shaft 10. Longitudinally-adjustable engaging parts, as screws 59, 60, Figs. 2 and 3, are provided on the arm 57 at opposite sides of the shaft 10 and coact, respectively, with cams 61, 62 revoluble with the shaft 10. Said engaging parts 59, 60 and cams 61, 62, serve to rock the arm 57 in reverse directions, and thereby move endwise the sleeve 53, the actuating member or shifter 52, the ring 49, and the section 30 of the thimble. The member or shifter 52 is formed with an upwardly-extending arm 63 which is substantially concentric with the pivot 40 of the carrier 34, and coacts with the walls of the groove 51 to prevent endwise movement of the section 30 of the thimble relatively to the section 29. Any desirable means is provided for preventing revolution of the section 30 when in inoperative position, the same including a shoulder 64, Figs. 2 and 3, on the carrier 34, and a notch 65 which is formed in the ring 49 and receives the shoulder 64 when the section 30 is moved endwise to said inoperative position.

When the cigar is placed in proper position upon the section 2 of the holder, its head end is within the one-half of the recess 31 in the section 28 of the thimble, and the free end of the wrapper extends from the sides and point of the head of the cigar, a considerably greater portion of the wrapper extending from one side of the point than from the other side thereof, as seen in Fig. 16. During the initial part of a rotation of the shaft 10, the cams 9 and 41 are moved out of engagement with the shoulder 11 and the carrier 34, whereupon the spring 12 moves the free end of the arm 5 downwardly for engaging the holder-section 4 with the cigar, and gravity moves the free end of the carrier 34 downwardly at an angle to the axis of the thimble for forcing the thimble-sections 29, 30 toward the thimble-section 28 into their position assumed in Fig. 5. The sections 29, 30 are then at one side of the position occupied thereby when the thimble is entirely closed, the opposing surfaces of the sections 28, 29 are at opposite sides of the portion of the wrapper projecting from the right-hand side of the head of the cigar, as shown in Fig. 16, and the like surfaces of the sections 28, 30 are spaced apart sufficiently so that the section 30 may move endwise without disarranging the free end of the wrapper which projects beyond the left-hand side of the head of the cigar and is interposed between said surfaces of the sections 28, 30 when the section 30 has moved endwise into its closed position.

After the thimble-sections 29, 30 have been depressed to the position illustrated in Fig. 5, the cam 45, Fig. 3, moves the carrier 34 endwise about the pivot 43 and forces said sections 29, 30 laterally or radially of the thimble, thus engaging the series of teeth provided on the section 29 with the gear 36, as shown in Fig. 6. By moving the sections 29, 30, as described, we reduce to a minimum any liability of the wrapper being caught between opposing surfaces of the sections 28, 29 and 30 at one side of the recess 31. After the cam 45 has moved the carrier 34 endwise, the cam 62, Fig. 3, moves the arm 57 on its pivot and forces the thimble-section 30 endwise relatively to the sections 28, 29, and entirely closes the thimble. The gear 36 then rotates the thimble, and during such rotation the head end of the cigar is finished. Before the shaft 10 makes a complete revolution, the gear 36 ceases to revolve the thimble, after which the cam 61 actuates the arm 57 to move the thimble-section 30 endwise in the reverse direction until the notch 65 in the ring 49 has received the shoulder 64, whereupon the cam 45 permits the spring 44 to return the carrier 34 endwise, and the cams 11 and 41, respectively, raise the free end of the holder-section 4, and the similar end of the carrier 34 supporting the thimble-sections 29, 30. The finished cigar may then be removed from the holder-section 2 and the thimble-section 28.

While the sections 29, 30 of the thimble are moving into and out of operative position, it is necessary to have the gear 36 remain stationary relatively to the shaft 10.

Consequently, the gear 36 is loosely mounted on the shaft 10 and is connected to such shaft during parts of each revolution thereof. Generally, the means for connecting the gear 36 to the shaft 10 comprises a plurality of shoulders 66, Fig. 4, fixed on the gear 36 in a series concentric with the axis of said gear, and also a movable shoulder 67, Fig. 12, provided on a slide which is arranged in a radial opening 68 in a disk 69 fixed on the shaft 10, and is forced outwardly from the axis of the disk 69 by a spring 71 mounted in the opening 68. Said slide is also provided with an extension 72 coacting with a suitable stationary cam 73, Fig. 4, to move the shoulder 67 inwardly toward the axis of the disk 69 into inoperative position, and to hold said shoulder in such position, said cam being of sufficient length to prevent the shoulder 67 from assuming its outward, or operative, position during the last portion of each revolution of the shaft 10 and the first portion of the subsequent revolution. The shaft 10 revolves independently of the gear 36 when the shoulder 67 is held from engaging the shoulders 66, and said gear revolves with the shaft 10 when the shoulder 67 engages one of the shoulders 66.

At the commencement of the operation of the heading mechanism, the shaft 10 and the gear 36 are in the positions assumed in Fig. 4, the shoulder 67 being held by the cam 73 out of position to engage the shoulders 66, and the gear 36 being disconnected from the shaft 10. During the first part of the revolution of the shaft 10, the cam 73 continues to hold the shoulder 67 in its inoperative position, but upon the further rotation of the shaft 10, the shoulder 67 passes beyond an end of the cam 73 in advance thereof, whereupon the spring 71 forces said shoulder 67 outwardly into operative position. As the shaft 10 continues its revolution, the shoulder 67 engages the first shoulder 66 in advance of the cam 73, after which the gear 36 revolves with said shaft until the shoulder 67 is engaged with the other end of the cam 73, whereupon said cam forces the shoulder 67 inwardly against the action of the spring 71 and disconnects the gear 36 from the shaft 10. Said shaft 10 then continues its revolution independently of the gear 36.

Means is preferably provided for preventing revolution of the gear 36 when disconnected from the shaft 10, said means including a locking part 74, Fig. 12, arranged at an angle to the gear 36 and movable endwise into and out of position to coact with suitable stop-means, as openings 75, Fig. 4, in said gear. A spring 76, Fig. 12, moves the locking part 74 into its operative position, and a cam 77 fixed on the shaft 10 effects movement of the locking part 74 in the reverse direction, this cam engaging one end of a pin 78 movable endwise in the bearing 15 for the shaft 10, and having its other end engaged with a rocking arm 79 which is pivoted at one side of the pin 78 to the bearing 15, and is pivoted at the opposite side of said pin to the locking part 74. When the movable shoulder 67 is disconnected by the cam 73 from one of the shoulders 66, the cam 77 permits the spring 76 to force the locking part 74 toward the gear 36 and into one of the openings 75, and when the shoulder 67 is forced into operative position by the spring 71, said cam 77 simultaneously forces the locking part 74 from operative position.

The knives of the heading mechanism are preferably secured to the disk 69, one knife 80 being rotated between the opposing end surfaces of the thimble-sections 28, 29, and the thimble-section 30, just before said section 30 is moved endwise into its operative position, and having an angularly-extending cutting edge which coacts with the similarly-arranged edge of the knife 39, Figs. 8 and 16, to cut the free end of the wrapper along the side, and crosswise of, the head end of the cigar, as seen in Fig. 16, and the other knife 81 being rotated past the outer ends of the sections 28, 29 and 30 after the section 30 assumes its operative position, and being formed with a single cutting edge for trimming the wrapper crosswise of the head end of the cigar.

During the operation of the knife 80, the free end of the wrapper is held from tearing by suitable clamping means comprising a part 82, Fig. 7, and a support 83, Fig. 15, the part 82 consisting of a thin plate, spaced apart from the sections 28 and 29 of the thimble, and fixed to an arm 84 projecting from the outer end of said section 29, and the support 83 consisting of the weighted end of a lever 85, Figs. 2 and 15, pivoted intermediate of its ends on a fixed pivot 86, Fig. 2. This support 85 is movable independently of the thimble into and out of position to coact with the clamping part 82. The other arm 87 of the lever 85 is engaged and operated by a pin 88, Figs. 2 and 4, fixed on the disk 69. When the sections 29, 30 of the thimble are moved into operative position, the clamping part 82 is carried into engagement with the upper side of the wrapper, and immediately afterward the pin 88 coacts with the arm 87 of the lever 85 and moves the support 83 upwardly to its position assumed in Fig. 15 in engagement with the lower side of the wrapper, and holds said support in such position until after the knife 80 has moved between the thimble-sections 28, 29, and the thimble-section 30 and the clamping parts 82, 83, to cut the wrapper. The rotation of the disk 69 then carries the pin 88 out of engagement with the arm 87, whereupon the weighted end of the lever 85, terminating in the support 83, moves downwardly by gravity to its inoperative position, and the thimble-section 30 is forced to its operative position.

This machine also preferably includes means for removing the wrapper-trimmings from the knife 81, the same comprising a revoluble member 89, Fig. 4, having a plurality of radial yielding arms 90 movable at opposite sides of the path of the knife 81. The member 89 is connected to the driving shaft A, or any other rotatable part, by any suitable means.

In the illustrated construction of this invention, we provide a closed paste-containing reservoir 92, Fig. 17, supported by the frame 1. This reservoir includes an inlet-valve 93 through which air under pressure is driven into the reservoir by any suitable means, not illustrated, said air serving to force the paste from the reservoir. A conduit 94, Figs. 2 and 4, extends from the reservoir 92 for conducting the paste therefrom, and its free end is supported by any desirable means, as a standard 95 and a brace 96, Fig. 4. This conduit is provided with a revoluble lateral branch of substantially right-angular form, the free end of one arm 97 of the branch being journaled in the main part of the conduit in alinement with the axis of the thimble, and the free end of the other arm 98 of said branch being connected to the thimble-section 28 eccentric to the axis of the thimble and communicating with the portion of the recess 31 in said thimble-section. By connecting the lateral branch of the conduit 94 to the thimble eccentric to its axis, the knives 80 and 81 are permitted to revolve to cut the wrapper without interfering with the arm 98 of said branch. The conduit 94 is provided with a valve 99 for controlling the flow of the paste therethrough, said valve having an arm 100 which is engaged by the pin 88 on the disk 69. During each revolution of the shaft 10, the pin 88 operates the arm 100 to open the valve 99 a sufficient length of time to permit the required amount of paste to enter the recess 31 from the lateral branch of the conduit 94.

This machine is preferably provided with knives 101, 102, Fig. 10, for trimming the tuck end of the cigar, the knife 101 being fixed to a support 103 and provided with a V-shaped cutting edge arranged at one end of the holder for the cigar in alinement with the cigar when clamped by said holder, and the knife 102 being journaled at one end in the support 103, and provided at its other end with a V-shape edge for coacting with the cutting edge of the knife 101. Said support 103 is generally adjustable in a direction coincident with the axis of the cigar when clamped by the cigar-holder, and is held in position by a bolt 104. The adjustment of the support 103 varies the position of the knives 101, 102 for trimming the tuck ends of cigars of different lengths. A gear 106 is fixed to the revoluble knife 102 and meshes with a gear 107 which is carried by the support 103, and meshes with a gear 108 fixed to the shaft 10 and formed of greater width than the gears 106, 107 in order to avoid disconnecting the gears 107, 108 during the adjustment of the support 103. When the cigar is laid upon the section 2 of the cigar-holder, the tuck end of the cigar rests upon the cutting edge of the fixed knife 101, and upon the operation of the heading mechanism, the knife 102 is revolved from its position assumed in Fig. 10 and coöperates with the stationary knife 101 to properly trim said end of the cigar.

After the cigar is headed and trimmed, as described, it may be discharged from the section 2 of the cigar-holder into a suitable receptacle by any desirable means, as an arm 109, Fig. 9, which is loosely mounted on the pivot 6 of the section 4 of said cigar-holder, is held in its normal position by a spring 110, and is actuated at the appropriate time by a cam 111 provided on the shaft 10, and coacting with a shoulder 112 on the arm 109.

What we claim is:

1. In a cigar-making machine, heading mechanism comprising a holder for holding the cigar stationary, a thimble for finishing the head end of the cigar having the free end of the wrapper projecting therefrom, the thimble being revoluble relatively to the holder, and having spaced apart surfaces between which the free end of the wrapper is interposed, and actuating means for revolving the thimble, substantially as and for the purpose specified.

2. In a cigar-making machine, heading mechanism comprising a holder for the cigar, a revoluble thimble for finishing the head end of the cigar having the free end of the wrapper projecting therefrom, the thimble including a plurality of separable sections, opposing surfaces of separable sections of the thimble being spaced apart for receiving between them the free end of the wrapper, and actuating means for revolving the thimble, substantially as and for the purpose specified.

3. In a cigar-making machine, heading mechanism comprising a holder for the cigar, a revoluble thimble for finishing the head end of the cigar including a plurality of sections separable from each other for opening the thimble, and actuating means for revolving the thimble, substantially as and for the purpose set forth.

4. In a cigar-making machine, heading mechanism comprising means for holding the cigar stationary, a revoluble thimble for finishing the head end of the cigar including a plurality of sections, and actuating means including mechanism for automatically opening and closing the thimble and for revolving the thimble, substantially as and for the purpose specified.

5. In a cigar-making machine, heading mechanism comprising a holder for the cigar, a revoluble thimble for finishing the head end of the cigar including a plurality of sections, one section being movable into and out of operative position, and actuating means for revolving the thimble, substantially as and for the purpose described.

6. In a cigar-making machine, heading mechanism comprising a holder for the cigar, a revoluble thimble for finishing the head end of the cigar including a plurality of sections, one section being movable toward and from a second section in a plurality of directions, and actuating means for revolving the thimble, substantially as and for the purpose set forth.

7. In a cigar-making machine, heading mechanism comprising a holder for the cigar, a revoluble thimble for finishing the head end of the cigar including a plurality of sections, one section being movable toward and from a second section in a direction at an angle to the axis of the thimble, and in a second direction at an angle to the first-mentioned direction, and actuating means for revolving the thimble, substantially as and for the purpose specified.

8. In a cigar-making machine, heading mechanism comprising a power-transmitting element, a holder for the cigar, a revoluble thimble for finishing the head end of the cigar including a plurality of sections coacting with the power-transmitting element, one section being movable into and out of position to coact with the power-transmitting element, and actuating means for operating the power-transmitting element, substantially as and for the purpose set forth.

9. In a cigar-making machine, heading mechanism comprising a power-transmitting element, a holder for the cigar, a revoluble thimble for finishing the head end of the cigar including a plurality of sections coacting with the power-transmitting element, one section being separable from the power-transmitting element and a second section, and being movable into and out of position to coact with the power-transmitting element and said second section, and actuating means for operating the power-transmitting element, substantially as and for the purpose specified.

10. In a cigar-making machine, heading mechanism comprising a gear, a holder for the cigar, a revoluble thimble for finishing the head end of the cigar including a plurality of sections provided, respectively, with a series of teeth meshing with said gear, one section being separable from the gear and a second section, and being movable into and out of position to coact with the gear and said second section, and actuating means for moving said one of the sections and operating the gear, substantially as and for the purpose described.

11. In a cigar-making machine, heading mechanism comprising a power-transmitting element, a holder for the cigar, a revoluble thimble for finishing the head end of the cigar including a plurality of sections coacting with the power-transmitting element, one section being separable from the power-transmitting element and a second section, and being movable toward said second section to close the thimble, and movable toward the axis of the power-transmitting element into position to coact with said element, and actuating means for moving said one of the sections and for operating the power-transmitting element, substantially as and for the purpose set forth.

12. In a cigar-making machine, heading mechanism comprising a gear, a holder for the cigar, a revoluble thimble for finishing the head end of the cigar including a plurality of sections provided, respectively, with a series of teeth meshing with said gear, one section being separable from the gear and a second section, and being movable about an axis toward said second section to close the thimble, and movable substantially radially toward the axis of the gear into position to coact with said gear, and actuating means for operating the gear, substantially as and for the purpose specified.

13. In a cigar-making machine, heading mechanism comprising a holder for the cigar, a revoluble thimble for finishing the head end of the cigar including a plurality of sections, one section being separable from a second section, and actuating means including a carrier for said one of the sections, said one of the sections being movable relatively to the carrier, substantially as and for the purpose described.

14. In a cigar-making machine, heading mechanism comprising a holder for the cigar, a revoluble thimble for finishing the head end of the cigar including a plurality of sections, one section being separable from a second section, and actuating means including a movable support, and a carrier for said one of the sections, said carrier being connected to the support and movable relatively thereto, and said one of the sections being movable relatively to the carrier, substantially as and for the purpose set forth.

15. In a cigar-making machine, heading mechanism comprising a gear, a holder for the cigar, a revoluble thimble for finishing the head end of the cigar including a plurality of sections provided, respectively, with a series of teeth meshing with the gear, one section being separable from the gear and a second section, and being movable about an axis toward said second section to close the thimble, and movable substantially radially toward the axis of the gear into position to coact with said gear, and actuating means including a shiftable pivot, and a carrier for said one of the sections mounted on the shiftable pivot, said one of the sections being movable relatively to the carrier, substantially as and for the purpose specified.

16. In a cigar-making machine, heading mechanism comprising a power-transmitting element, a holder for the cigar, a revoluble thimble for finishing the head end of the cigar including a plurality of sections coacting with the power-transmitting element, one section being separable from a second section and movable toward said second section to close the thimble, a support for said second section, and actuating means including a carrier for said one of the sections, the opposing faces of the support and carrier forming a bearing for the thimble, substantially as and for the purpose described.

17. In a cigar-making machine, heading mechanism comprising a holder for the cigar, and a thimble for finishing the head end of the cigar including a plurality of sections, one section being movable relatively to another section endwise of the cigar into and out of operative position, substantially as and for the purpose set forth.

18. In a cigar-making machine, heading mechanism comprising a holder for the cigar, and a thimble for finishing the head end of the cigar including a plurality of sections, one section being normally arranged in inoperative position, and being movable relatively to another section endwise of the axis of the thimble into operative position, substantially as and for the purpose specified.

19. In a cigar-making machine, heading mechanism comprising a holder for the cigar, and a thimble for finishing the head end of the cigar including a plurality of sections, two of said sections being normally arranged in inoperative position, and being movable together until one of such sections assumes an operative position, and the other of said two of the sections being movable relatively to said one of the two sections endwise of the axis of the thimble into operative position, substantially as and for the purpose described.

20. In a cigar-making machine, heading mechanism comprising a holder for the cigar, and a thimble for finishing the head end of the cigar including a plurality of sections, one section being provided with a guide extending substantially parallel to the axis of the thimble, and a second section being normally arranged in inoperative position, and being movable relatively to said one of the sections endwise of the axis of the thimble into operative position, said second section having a part movable in the guide, substantially as and for the purpose set forth.

21. In a cigar-making machine, heading mechanism comprising a holder for the cigar, and a thimble for finishing the head end of the cigar including a plurality of sections, one section having an opening extending therethrough substantially parallel to the axis of the thimble, and a second section being normally arranged in inoperative position, and being movable relatively to said one of the sections endwise of the axis of the thimble into operative position, said second section having a part movable in such opening, substantially as and for the purpose specified.

22. In a cigar-making machine, heading mechanism comprising a holder for the cigar, a thimble for finishing the head end of the cigar including a plurality of sections, one section being provided with a guide extending substantially parallel to the axis of the thimble, and a second section being normally arranged in inoperative position, and being movable relatively to said one of the sections endwise of the axis of the thimble into operative position, said second section having a part movable in the guide, and being provided with means having a peripheral groove, and actuating means including a part coacting with said groove, substantially as and for the purpose described.

23. In a cigar-making machine, heading mechanism comprising a holder for the cigar, a revoluble thimble for finishing the head end of the cigar including a plurality of sections, one section being normally arranged in inoperative position, and being movable into and out of operative position, means for preventing revolution of said section when in inoperative position, and actuating means for revolving the thimble, substantially as and for the purpose set forth.

24. In a cigar-making machine, heading mechanism comprising a holder for the cigar, a revoluble thimble for finishing the head end of the cigar, a paste-conduit having a revoluble part connected to the thimble, and actuating means for revolving the thimble, substantially as and for the purpose specified.

25. In a cigar-making machine, heading mechanism comprising a gear provided with a shoulder, a holder for the cigar, a revoluble thimble for finishing the head end of the cigar, said thimble being provided with a pinion meshing with the gear, actuating means for revolving the gear, the same including a shoulder revoluble about the axis of the gear and coacting with the first-mentioned shoulder for revolving the gear, and means for holding the second-mentioned shoulder in inoperative position during a portion of its revolution, substantially as and for the purpose specified.

26. In a cigar-making machine, heading mechanism comprising a gear provided with a plurality of shoulders, a holder for the cigar, a revoluble thimble for finishing the head end of the cigar, said thimble being provided with a pinion meshing with the gear, actuating means for revolving the gear, the same including a yielding shoulder revoluble about the axis of the gear and coacting with the first-mentioned shoulders, and means for holding the yielding shoulder in inoperative position during a portion of its revolution, substantially as and for the purpose described.

27. In a cigar-making machine, heading mechanism comprising a power-transmitting element, a holder for the cigar, a revoluble thimble for finishing the head end of the cigar, the power-transmitting element being connected to the revoluble thimble for rotating the latter, actuating means connected to the power-transmitting element, means for disconnecting the power-transmitting element from the actuating means, and spring-pressed, non-revoluble means for preventing movement of the power-transmitting element when disconnected from the actuating means, substantially as and for the purpose set forth.

28. In a cigar-making machine, heading mechanism comprising a gear formed with a plurality of stop-means, a holder for the cigar, a revoluble thimble for finishing the head end of the cigar, said thimble being provided with a pinion meshing with the gear, actuating means including means for connecting the gear to the actuating means, means for holding the last-mentioned means in inoperative position during a portion of the operation of the actuating means, a locking part for coacting with said stop-means, a spring for moving the locking part in one direction, and a cam for moving the locking part in the opposite direction, substantially as and for the purpose specified.

29. In a cigar-making machine, heading mechanism comprising a holder for the cigar, a thimble for finishing the head end of the cigar, a knife revoluble about an axis substantially parallel to the axis of the thimble for cutting the wrapper at the head end of the cigar, and actuating means for the knife, substantially as and for the purpose described.

30. In a cigar-making machine, heading mechanism comprising a holder for the cigar, a thimble for finishing the head end of the cigar, a knife formed with an angularly-extending edge for cutting the wrapper along the side, and crosswise of, the head end of the cigar, and actuating means for the knife, substantially as and for the purpose set forth.

31. In a cigar-making machine, heading mechanism comprising a holder for the cigar, a thimble for finishing the head end of the cigar, a plurality of knives revoluble about an axis substantially parallel to the axis of the thimble, one knife operating to cut the wrapper at the head end of the cigar, and the other knife operating to trim the wrapper at the head end of the cigar, and actuating means for the knives, substantially as and for the purpose specified.

32. In a cigar-making machine, heading mechanism comprising a holder for the cigar, a thimble for finishing the head end of the cigar, a plurality of knives, one knife being formed with an angularly-extending edge for cutting the wrapper along the side, and crosswise of, the head end of the cigar, and the other knife trimming the wrapper crosswise of said head end of the cigar, and actuating means for the knives, substantially as and for the purpose described.

33. In a cigar-making machine, heading mechanism comprising a holder for the cigar, a thimble for finishing the head end of the cigar, a plurality of revoluble knives, one knife being formed with an angularly-extending edge for cutting the wrapper along the side, and crosswise of, the head end of the cigar, and the other knife trimming the wrapper crosswise of said head end of the cigar, and actuating means for the knives, substantially as and for the purpose set forth.

34. In a cigar-making machine, heading mechanism comprising a holder for the cigar, a thimble for finishing the head end of the cigar including a plurality of sections, one section being movable relatively to a second section, and a knife movable between opposing surfaces of said sections for cutting the wrapper at the head end of the cigar, substantially as and for the purpose specified.

35. In a cigar-making machine, heading mechanism comprising a holder for the cigar, a thimble for finishing the head end of the cigar including a plurality of sections, one section being movable relatively to a second section, a plurality of knives, one knife being movable between opposing surfaces of said sections for cutting the wrapper at the head end of the cigar, and a second knife being movable at the outer side of the sections for trimming the wrapper at the head end of the cigar, and actuating means including mechanism for moving said one of the sections relatively to said second section before the operation of said second knife, substantially as and for the purpose described.

36. In a cigar-making machine, heading mechanism comprising a holder for the cigar, a thimble for finishing the head end of the cigar, a knife for cutting the wrapper at the head end of the cigar, and means for engaging opposite sides of the end of the wrapper during the operation of the knife, substantially as and for the purpose set forth.

37. In a cigar-making machine, heading mechanism comprising a holder for the cigar, a thimble for finishing the head end of the cigar, a support for the end of the wrapper, said support being spaced apart from a portion of the thimble, and a knife movable between said portion of the thimble and the support for cutting the wrapper at the head end of the cigar, substantially as and for the purpose specified.

38. In a cigar-making machine, heading mechanism comprising a holder for the cigar, a thimble for finishing the head end of the cigar, means for engaging opposite sides of the end of the wrapper, said means being spaced apart from a portion of the thimble, and a knife movable between said portion of the thimble and said means for cutting the wrapper at the head end of the cigar, substantially as and for the purpose described.

39. In a cigar-making machine, heading mechanism comprising a holder for the cigar, a thimble for finishing the head end of the cigar, a knife for cutting the wrapper at the head end of the cigar, means for engaging opposite sides of the end of the wrapper during the operation of the knife, said means including a part movable toward and from said end of the wrapper, and actuating means for operating said movable part and the knife, substantially as and for the purpose set forth.

40. In a cigar-making machine, heading mechanism comprising a holder for the cigar, a revoluble thimble for finishing the head end of the cigar, a knife for cutting the wrapper at the head end of the cigar, means for engaging opposite sides of the end of the wrapper during the operation of the knife, said means including a part revoluble with the thimble, and a second part movable toward and from said end of the wrapper, and actuating means for revolving said thimble and operating the knife and said movable part of the means for engaging the wrapper, substantially as and for the purpose specified.

41. In a cigar-making machine, heading mechanism comprising a power-transmitting element, a holder for the cigar, a revoluble thimble for finishing the head end of the cigar, actuating means connected to the power-transmitting element, a knife movable with the actuating means for cutting the wrapper at the head end of the cigar, and means for disconnecting the power-transmitting element from the actuating means during a portion of the operation of said actuating means, substantially as and for the purpose described.

42. In a cigar-making machine, heading mechanism comprising a holder for the cigar, a thimble for finishing the head end of the cigar, a knife for trimming the wrapper at the head end of the cigar, means for removing the wrapper-trimmings from the knife, and actuating means for the knife and the first-mentioned means, substantially as and for the purpose set forth.

43. In a cigar-making machine, heading mechanism comprising a holder for the cigar, a thimble for finishing the head end of the cigar, a knife for trimming the wrapper at the head end of the cigar, a revoluble member having a plurality of radial arms movable on opposite sides of the knife for removing wrapper-trimmings from said knife, and actuating means for the knife and the revoluble member, substantially as and for the purpose specified.

44. In a cigar-making machine, heading mechanism comprising a holder for the cigar, a thimble for finishing the head end of the cigar, means for trimming the tuck end of the cigar comprising a stationary knife and a revoluble knife coacting with the stationary knife, and actuating means for revolving the revoluble knife, substantially as and for the purpose set forth.

45. In a cigar-making machine, heading mechanism comprising a holder for the cigar, a thimble for finishing the head end of the cigar, a support adjustable lengthwise of the cigar, and a revoluble knife for trimming the tuck end of the cigar, said knife being carried by the support, and actuating means for revolving the revoluble knife, substantially as and for the purpose specified.

46. In a cigar-making machine, heading mechanism comprising a holder for the cigar, means within the holder for marking the cigar, and a thimble for finishing the head end of the cigar, substantially as and for the purpose described.

47. In a cigar-making machine, heading mechanism comprising a holder for the cigar, means within the holder for marking the cigar, means for heating the former means, and a thimble for finishing the head end of the cigar, substantially as and for the purpose set forth.

48. In a cigar-making machine, the combination of heading mechanism, and actuating means including two members frictionally connected, one of said members coacting with the heading mechanism, substantially as and for the purpose specified.

49. In a cigar-making machine, the combination of heading mechanism, and actuating means including two shafts, one shaft being frictionally connected to the other shaft and driven thereby, said one of the shafts coacting with the heading mechanism, substantially as and for the purpose described.

50. In a cigar-making machine, the combination of heading mechanism, and actuating means including two shafts, a worm fixed to one of the shafts, a worm-gear loosely mounted on the other shaft and coacting with said worm, and a disk fixed to said other shaft and frictionally engaging the worm-gear, the second-mentioned shaft coacting with the heading mechanism, substantially as and for the purpose set forth.

In testimony whereof, we have hereunto signed our names in the presence of two attesting witnesses, in the city of Syracuse, county of Onondaga, and State of New York, this 15th day of Sept. 1913.

WILLARD C. LIPE.
STELLA S. COUGHTRY,
*Administratrix.*

Witnesses:
GEO. C. CARHART,
EDWARD H. HUNGERFORD.

Copies of this patent may be obtained for five cents each, by addressing the "Commissioner of Patents, Washington, D. C."